United States Patent
Liu et al.

(10) Patent No.: US 7,802,300 B1
(45) Date of Patent: Sep. 21, 2010

(54) METHOD AND APPARATUS FOR DETECTING AND REMOVING KERNEL ROOTKITS

(75) Inventors: Peter Liu, Taipei (TW); Jason Yueh, Taipei (TW); Gene Lin, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 898 days.

(21) Appl. No.: 11/702,965

(22) Filed: Feb. 6, 2007

(51) Int. Cl.
G06F 11/00 (2006.01)
G06F 12/14 (2006.01)
G06F 12/16 (2006.01)
G08B 23/00 (2006.01)
G06F 7/04 (2006.01)
G06F 17/30 (2006.01)
H04N 7/16 (2006.01)

(52) U.S. Cl. .............. 726/23; 726/22; 726/24; 726/25; 726/26

(58) Field of Classification Search .............. 726/22–26
See application file for complete search history.

(56) References Cited

U.S. PATENT DOCUMENTS

| | | | |
|---|---|---|---|
| 6,647,400 | B1 | 11/2003 | Moran |
| 6,826,697 | B1 | 11/2004 | Moran |
| 6,996,843 | B1 | 2/2006 | Moran |
| 7,007,301 | B2 | 2/2006 | Crosbie et al. |
| 7,032,114 | B1 | 4/2006 | Moran |
| 7,571,482 | B2 * | 8/2009 | Polyakov et al. .............. 726/24 |
| 7,631,357 | B1 * | 12/2009 | Stringham ................... 726/24 |
| 2005/0193428 | A1 * | 9/2005 | Ring et al. ................... 726/22 |
| 2005/0204205 | A1 | 9/2005 | Ring et al. |
| 2007/0078915 | A1 * | 4/2007 | Gassoway .................. 707/205 |
| 2007/0261120 | A1 * | 11/2007 | Arbaugh et al. ............... 726/26 |

OTHER PUBLICATIONS

Application programming interface (API) from Wikipedia, the free encyclopedia; Jul. 2006, pp. 1-3 [retrieved on Aug. 14, 2006]. Retrieved from the internet: http://en.wikipedia.org/wiki/Application_programming_interface.
NtDeviceIoControlFile Function, 2006 Microsoft Corporation, pp. 1-3 (retrieved on Aug. 15, 2006]. Retrieved from the internet: http://msdn.microsoft.com/library/en-us/winui/winui/windowsuserinterface/lowlevelclientsupport/misc/ntdeviceiocontrolfile.asp.
DeviceIoControl, 2006 Microsoft Corporation, pp. 1-4 (retrieved on Aug. 15, 2006]. Retrieved from the internet: http://msdn.microsoft.com/library/en-us/devio/base/deviceiocontrol.asp?frame=true.

(Continued)

Primary Examiner—Shin-Hon Chen
(74) Attorney, Agent, or Firm—Okamoto & Benedicto LLP

(57) ABSTRACT

In one embodiment, an anti-rootkit module compares operating system kernel binary files to their loaded kernel file image in memory to find a difference between them. The difference may be scanned for telltale signs of rootkit modification. To prevent rootkits from interfering with memory access of the kernel file image, a pre-scan may be performed to ensure that paging functions and the interrupt dispatch table are in known good condition. If the difference is due to a rootkit modification, the kernel file image may be restored to a known good condition to disable the rootkit. A subsequent virus scan may be performed to remove remaining traces of the rootkit and other malicious codes from the computer.

15 Claims, 6 Drawing Sheets

OTHER PUBLICATIONS

NtCreateFile, 2006 Microsoft Corporation, pp. 1-8 (retrieved on Aug. 14, 2006]. Retrieved from the internet: http://msdn.microsoft.com/library/default.asp?url=/library/en-us/devnotes/winprog/ntcreatefile.asp.

James Butler and Sherri Sparks "Windows rootkits of 2005, part one" Nov. 4, 2005, pp. 1-9 (retrieved on Aug. 14, 2006]. Retrieved from the internet: http://www.securityfocus.com/infocus/1850.

James Butler and Sherri Sparks "Windows rootkits of 2005, part two" Nov. 17, 2005, pp. 1-11 (retrieved on Aug. 14, 2006]. Retrieved from the internet: http://www.securityfocus.com/infocus/1851.

James Butler and Sherri Sparks "Windows rootkits of 2005, part three" Jan. 5, 2006, pp. 1-10 (retrieved on Aug. 14, 2006. Retrieved from the internet: http://www.securityfocus.com/infocus/1854.

Chkrootkit—locally checks for signs of a rootkit, Oct. 2006, 2 sheets, webpage [online] [retrieved on Jan. 29, 2007]. Retrieved from the internet: http://www.chkrootkit.org/.

Bryce Cogswell, et al. "RootkitRevealer v1.71" Nov. 1, 2006, pp. 1-5 (retrieved on Jan. 29, 2007]. Retrieved from the internet: http://www.microsoft.com/technet/sysinternals/Security/RootkitRevealer.mspx.

Slashdot—SysInternals Releases RootkitRevealer, posted Feb. 23, 2005 by CmdrTaco, 25 sheets, [retrieved on Jan. 29, 2007]. Retrieved from the internet: http://it.slashdot.org/article.pl?sid=05/02/23/1353258&from=rss.

\* cited by examiner

METHOD AND APPARATUS FOR DETECTING AND REMOVING KERNEL ROOTKITS

BACKGROUND OF THE INVENTION

1. Field of the Invention

The present invention relates generally to computer antivirus, and more particularly but not exclusively to detection and removal of kernel rootkits.

2. Description of the Background Art

Rootkits comprise computer-readable program code designed to conceal running processes, files, or system data. Rootkits may be used to surreptitiously modify parts of the operating system or install themselves as drivers or kernel modules. Increasingly, rootkits are being used by virus coders as malicious code or part of malicious code. Kernel rootkits, also known as "kernel-mode rootkits," are especially difficult to detect because they patch the operating system kernel to prevent common file and registry scans from detecting them. Even when kernel rootkits are detected by behavior-monitoring, they are still difficult to remove because they usually modify corresponding kernel application programming interface (API) to prevent any application program from removing them. What is needed is an effective technique that allows for detection and removal of kernel rootkits.

SUMMARY

In one embodiment, an anti-rootkit module compares operating system kernel binary files to their loaded kernel file image in memory to find a difference between them. The difference may be scanned for telltale signs of rootkit modification. To prevent rootkits from interfering with memory access of the kernel file image, a pre-scan may be performed to ensure that paging functions and the interrupt dispatch table are in known good condition. If the difference is due to a rootkit modification, the kernel file image may be restored to a known good condition to disable the rootkit. A subsequent virus scan may be performed to remove remaining traces of the rootkit and other malicious codes from the computer.

These and other features of the present invention will be readily apparent to persons of ordinary skill in the art upon reading the entirety of this disclosure, which includes the accompanying drawings and claims.

The use of the same reference label in different drawings indicates the same or like components.

Figure 4A:
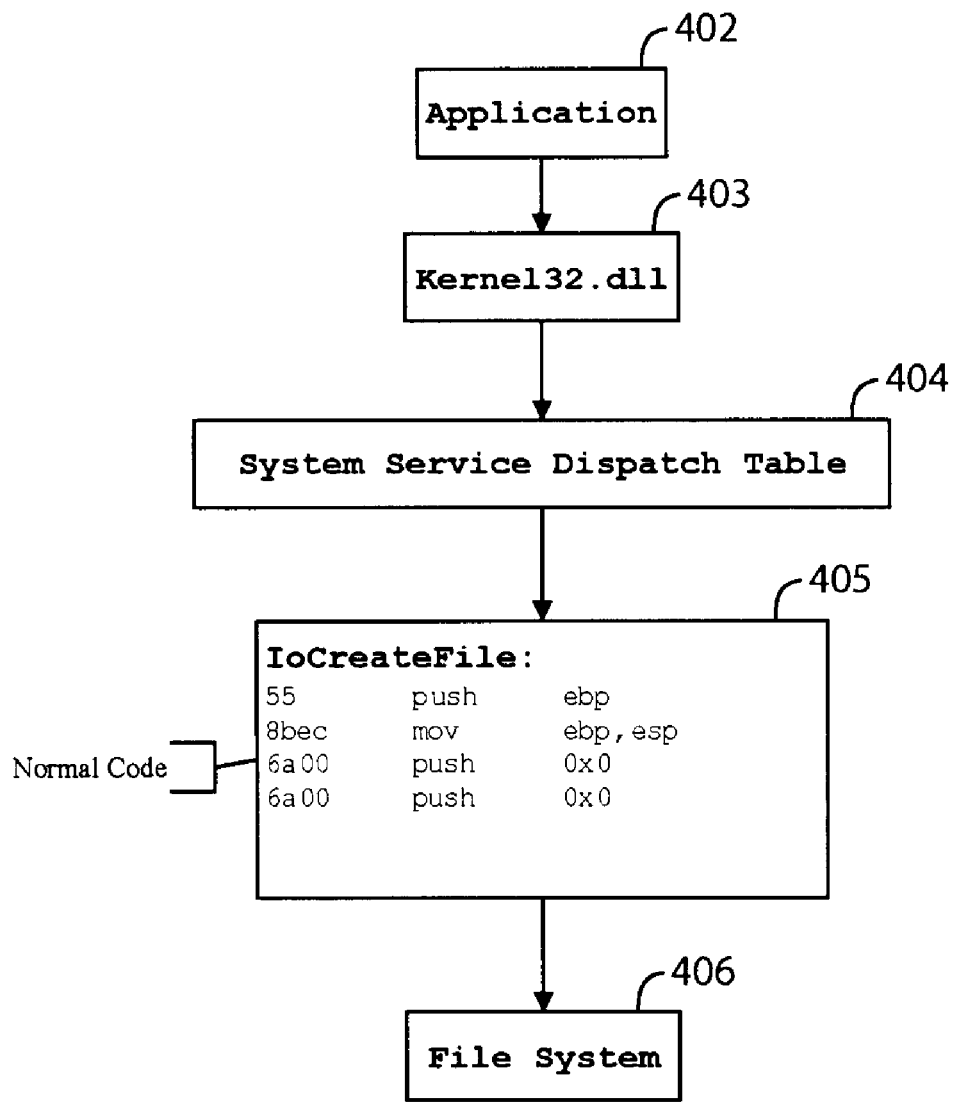

FIG. 4A shows a flow diagram schematically illustrating an example call flow from an application to a file system in a virus-free computer.

Figure 4B:
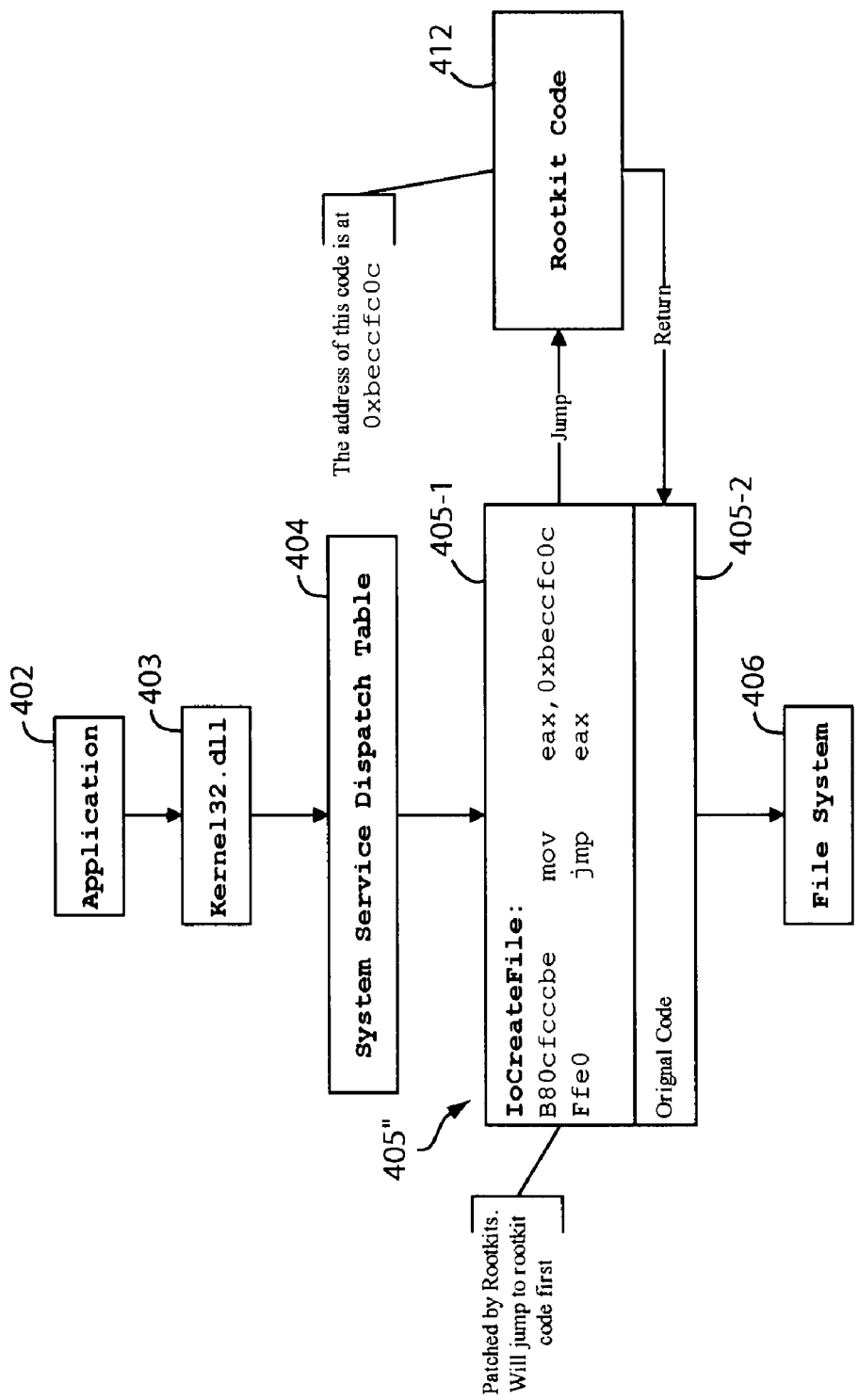

FIG. 4B shows a flow diagram schematically illustrating an example call flow from an application to a file system in the case where the computer is infected by a kernel rootkit.

Figure 5:
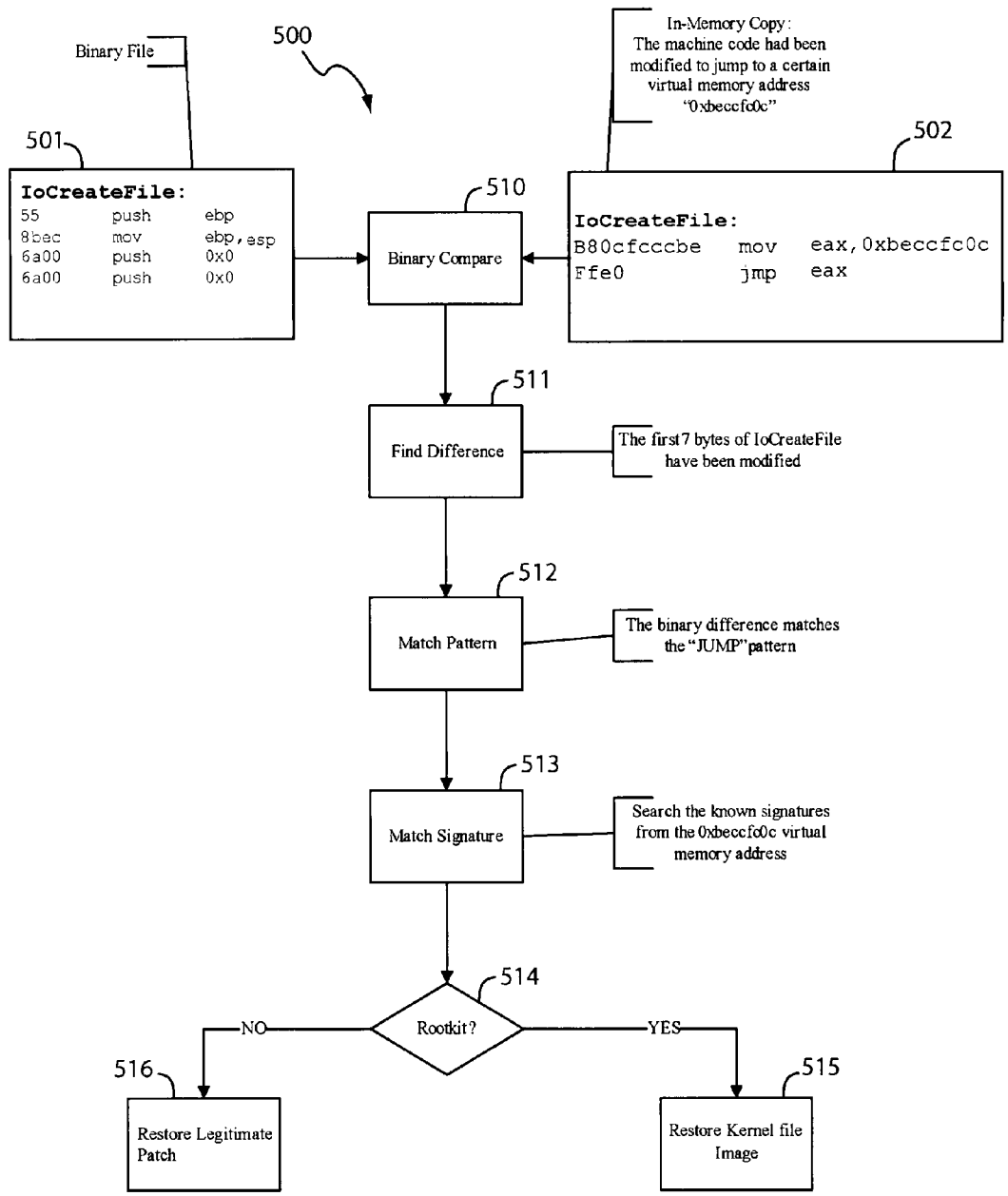

FIG. 5 shows a flow diagram of a method of detecting kernel rootkits in accordance with an embodiment of the present invention.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Computer viruses, worms, Trojans, rootkits, and spyware are examples of malicious codes that have plagued computer systems throughout the world. Although there are technical differences between each type of malicious code, malicious codes are also collectively referred to herein as "viruses."

Figure 1:
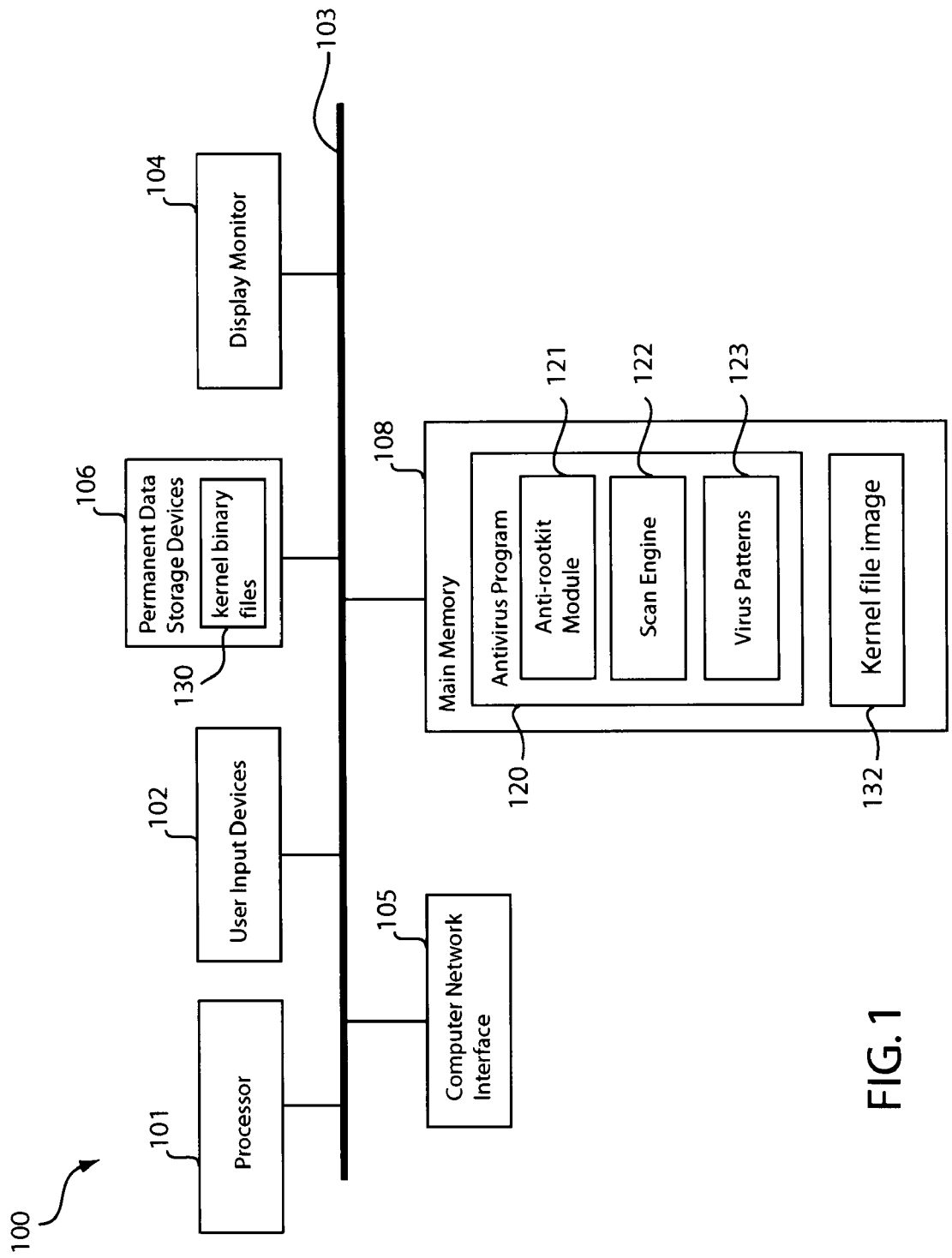
FIG. 1 shows a computer in accordance with an embodiment of the present invention.

Referring now to FIG. 1, there is shown a schematic diagram of a computer 100 in accordance with an embodiment of the present invention. The computer 100 may be configured as a server computer, a client computer, or some other computing apparatus depending on the application. The computer 100 may have less or more components to meet the needs of a particular application. As shown in FIG. 1, the computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more permanent data storage devices 106 (e.g., hard drive), a display monitor 104 (e.g., LCD, flat panel monitor), a computer network interface 105 (e.g., network adapter, modem), and a main memory 108 (e.g., RAM).

In the example of FIG. 1, the main memory 108 includes an antivirus program 120. The antivirus program 120 may be stored in the data storage device 106 and loaded into the main memory 108 for execution by the processor 101. The main memory 108 also includes operating system kernel file image 132, which comprises an in-memory copy of operating system kernel binary files 130 stored in the data storage device 106. In one embodiment, the computer 100 runs the Microsoft Windows™ operating system. However, the invention is generally applicable to other operating systems.

The antivirus program 120 may comprise an anti-rootkit module 121, a scan engine 122, and virus patterns 123. The anti-rootkit module 121 may comprise computer-readable program code for detecting rootkits. In one embodiment, the anti-rootkit module 121 is configured to perform a pre-scan to prevent a rootkit from interfering with the operation of the anti-rootkit module 121, to find portions of the kernel file image 132 modified by a rootkit, and to restore these portions to a known good condition. As will be more apparent below, these actions disable the rootkit, allowing the rootkit to be found by the scan engine 122 for removal.

The scan engine 122 may comprise computer-readable program code for detecting computer viruses, such as rootkits. In one embodiment, the scan engine 122 scans data for computer viruses by comparing their contents to virus signatures, patterns, regular expressions, and other information for identifying computer viruses stored in the virus patterns 123. For example, the scan engine 122 may employ pattern matching algorithms to detect rootkits. The scan engine 122 may also be configured to perform a cleanup action, such as removal of detected rootkits and other malicious codes. The scan engine 122 may employ conventional antivirus algorithms, such as those in commercially available antivirus products from Trend Micro, Inc.

The computer virus patterns 123 may include computer virus signatures, patterns, regular expressions, and other information for identifying computer viruses. In one embodiment, the virus patterns 123 also include patterns indicative of rootkit modification and infestation. The virus patterns 123 may be periodically updated to include the latest information for identifying rootkits and modifications they make on in-memory copies of operating system kernel files. For example, the virus patterns 123 may be periodically updated over the Internet by the vendor of the antivirus program 120 using information obtained by their antivirus research center (e.g., TrendLabs™ antivirus research center of Trend Micro, Inc.).

Figure 2:
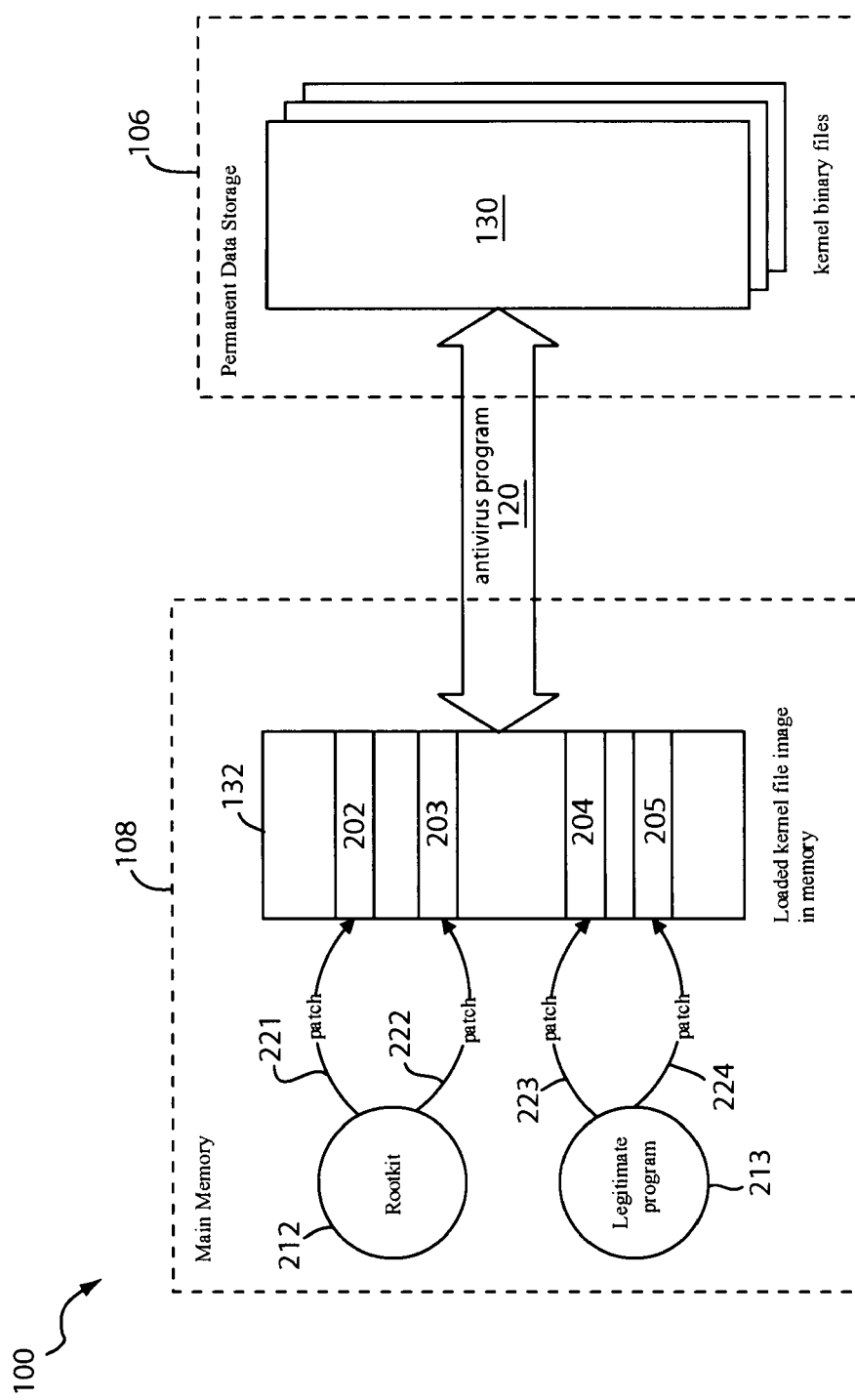
FIG. 2 shows a flow diagram schematically illustrating the operation of an antivirus program in accordance with an embodiment of the present invention.

Referring now to FIG. 2, there is shown a flow diagram schematically illustrating the operation of the antivirus program 120 in accordance with an embodiment of the present invention. A kernel rootkit 212 may escape detection and removal by modifying the kernel file image 132, which is the image of the kernel binary files 130 loaded in the main memory 108. In the example of FIG. 2, the rootkit 212 modifies locations 202 (see arrow 221) and locations 203 (see arrow 222) of the memory 108 containing the kernel file image 132. The modifications may infect the kernel to prevent application programs from accessing executable files of the rootkit 212 stored in the data storage device 106, accessing locations of the memory 108 containing the modifications, or making function calls to detect and remove the rootkit 212. These allow the rootkit 212 to perform its malicious functions, such as using the computer 100 to send spam, opening a back door to the computer 100, monitor usage of the computer 100, and so on.

Some legitimate (i.e., non-malicious) programs may also modify the kernel file image 132. These modifications allow a legitimate program to perform its functions. As will be explained later with reference to FIG. 3, the anti-rootkit module 121 may take legitimate patches into account so as not to interfere with the operation of corresponding legitimate programs. In the example of FIG. 2, the legitimate program 213 modifies locations 204 (see arrow 223) and locations 205 (see arrow 224) of the memory 108 containing in-memory copies of the kernel binary files 130.

In one embodiment, the anti-rootkit module 121 verifies that the kernel binary files 130 are virus-free by comparing their checksum with a known good checksum. The good checksum may be obtained from a known good copy of the kernel binary files 130, for example.

The anti-rootkit module 121 compares the contents of the kernel binary files 130 to those of the kernel file image 132 to detect differences between them. For each detected difference, the anti-rootkit module 121 scans the difference to determine if the difference is due to a modification made by a rootkit. For example, the anti-rootkit module 121 may consult the virus patterns 123 to determine if the difference matches one or more patterns known to be due to a modification by a rootkit (e.g., as observed in honey pot computers). The anti-rootkit module 121 may also check memory locations referenced in the difference to see if those memory locations contain data indicative of rootkit infestation. If the difference is attributable to a rootkit, the anti-rootkit module 121 may restore the corresponding modified memory locations to their previous state. Otherwise, if the difference is not indicative of a rootkit modification, the anti-rootkit module 121 continues looking for modifications done by rootkits and restoring memory locations modified by rootkits. Performing the aforementioned procedure for the entirety of the kernel file image 132 advantageously results in the rootkit 212 being prevented from interfering with subsequent operations performed by the scan engine 122 to find the rootkit 212 and remove it from the computer 100. That is, the scan engine 122 may be employed to find and remove remaining traces of the rootkit 212 once the kernel file image 132 has been rid of modifications made by the rootkit 212.

Figure 3:
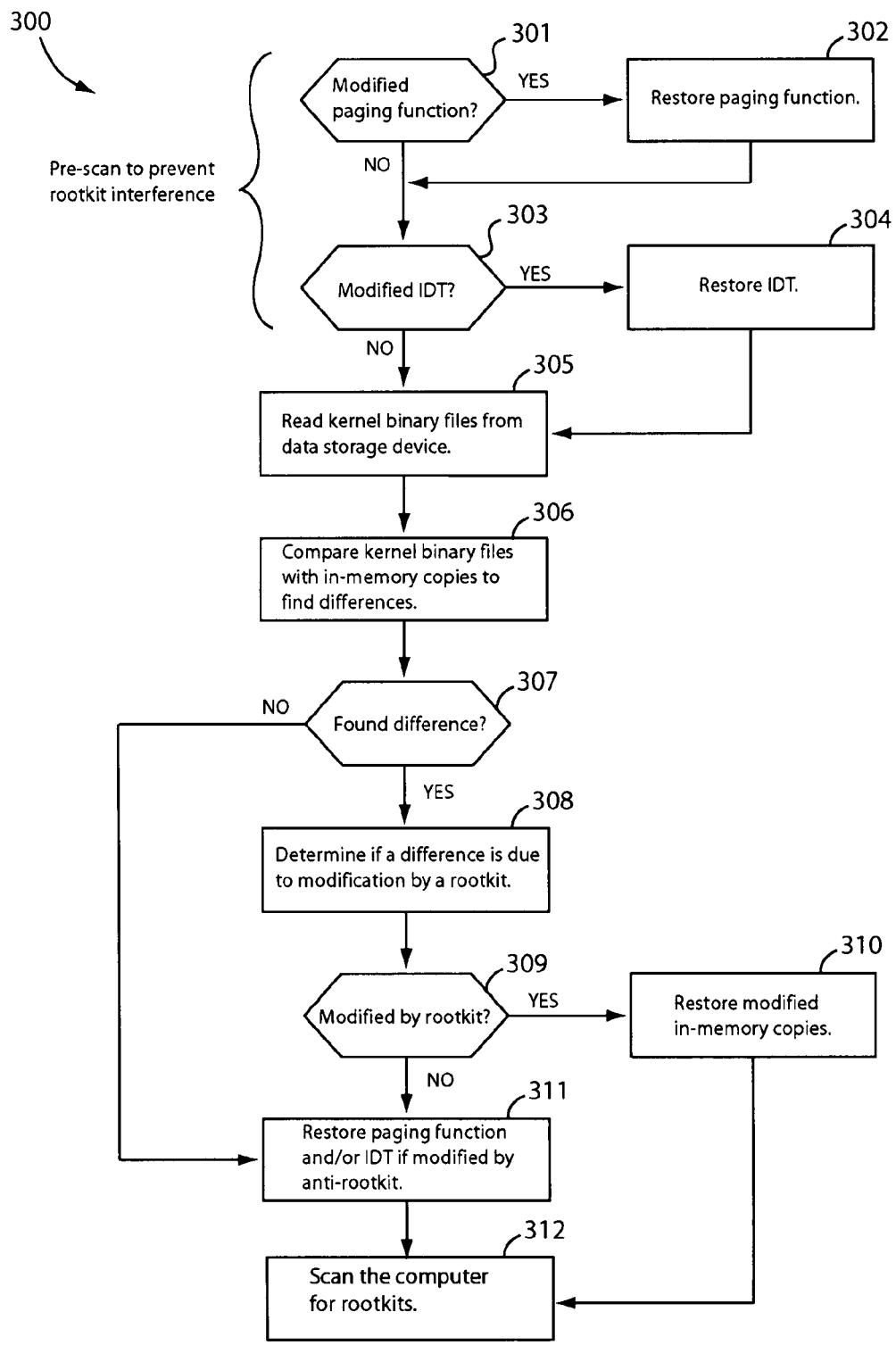
FIG. 3 shows a flow diagram of a method of detecting and removing kernel rootkits in accordance with an embodiment of the present invention.

FIG. 3 shows a flow diagram of a method 300 of detecting and removing kernel rootkits in accordance with an embodiment of the present invention. The method 300 is explained using components of the computer 100 shown in FIG. 1 for illustration purposes only. Other components may also be used without detracting from the merits of the present invention. The method 300 is explained using the Microsoft Windows™ operating system running in an x86 processor (e.g., Intel Pentium™ processor) as an example.

The method 300 begins with the anti-rootkit module 121 performing a pre-scan to prevent any rootkit from interfering with subsequent rootkit detection and removal operations. The pre-scan is configured to allow the anti-rootkit module 121 to access the kernel file image 132 in the memory 108 even when the computer 100 is infested with rootkits. In the example of the FIG. 3, the pre-scan comprises steps 301-304.

An x86 processor directly executes instructions for accessing virtual memory locations that are in physical memory. That is, virtual memory access may be performed without having to go through the operating system, thereby bypassing kernel rootkits. At first glance, this allows an application to readily access the kernel file image 132 in the memory 108 to find and remove a kernel rootkit. However, a kernel rootkit may still prevent an application from finding and removing the kernel rootkit by marking the virtual memory addresses containing the kernel file image 132 as paged out. Virtual memory locations typically cannot be accessed directly when paged out, forcing any application wanting to access the virtual memory to go through the system's paging function. Generally speaking, a paging function is an operating system exception handler that moves paged out memory locations to main memory and marks those locations as paged in to allow them to be read. A rootkit may modify the paging function to prevent access to the rootkit.

To ensure the integrity of a paging function, the anti-rootkit module 121 determines during the pre-scan whether or not the paging function has been modified (step 301). If the paging function has been modified, the anti-rootkit module 121 restores the paging function back to its original condition (step 302). For example, the anti-rootkit module 121 may put the paging function back to its pre-modified/patched or known good condition.

In-line patching typically involves modification of the first few bytes of the target function. The anti-rootkit module 121 may thus be configured to store or have access to the first few bytes (e.g., 7 to 10 bytes) of important operating system APIs, such as paging functions, to be able to detect modifications to these functions and restore them back as needed. For example, the anti-rootkit module 121 may compare the values of the first few bytes of a paging function loaded in memory with known good values to determine if the paging function has been patched. If so, the anti-rootkit module 121 may overwrite the modifications by restoring the paging function using the known good values.

A rootkit may also intercept and interfere with virtual memory access by hooking the interrupt service routine (ISR) for the paging function by modifying the operating system's interrupt dispatch table (IDT), which contains interrupt service routine pointers. To prevent a paging function from being intercepted, the anti-rootkit module 121 checks whether or not the interrupt dispatch table has been modified (step 303). If the interrupt dispatch table has been modified, the anti-rootkit module 121 restores the interrupt dispatch table to a known good condition (step 304). For example, the anti-rootkit module 121 may replace values in the interrupt dispatch table with known good ones. In one embodiment, the anti-rootkit module 121 stores or has access to known good values for the interrupt dispatch table. This allows the anti-rootkit module 121 to compare the interrupt dispatch table's current values to known good values to determine if the interrupt dispatch table has been modified, and to copy known good values back to the interrupt dispatch table to restore it as needed.

Completion of the pre-scan allows the anti-rootkit module 121 to use a paging function to read virtual memory locations containing the kernel file image 132. This allows the kernel file image 132 to be subsequently compared to the kernel binary files 130 to find differences between them (see step 306).

The anti-rootkit module 121 may read the kernel binary files 130 (step 305) for subsequent comparison to the kernel file image 132 (see step 306). To prevent a rootkit from interfering with the reading of the kernel binary files 130, the anti-rootkit module 121 may build up an I/O (input/output) request packet that may be passed directly to the operating system's file system to query the contents of the kernel binary files 130. This procedure is safer than using a provided API (e.g., IoCreateFile in the Microsoft Windows™ operating system) or other well known function or file I/O service, which are typical targets of rootkits. In the Microsoft Windows™ operating system, the I/O request packet may comprise an I/O Request Packet (IRP). To use an IRP to read the contents of a file, one may (a) get the target device object (e.g., C-drive), (b) build the IRP (e.g., using the IoAllocateIrp), (c) pass the IRP to the target device (e.g., using IoCallDriver), and (d) get the contents of the file from the returned buffer.

The anti-rootkit module 121 may verify that the kernel binary files 130 have not been infected by a rootkit or other malicious code by taking its checksum for comparison to a known good checksum.

The anti-rootkit module 121 may compare the kernel binary files 130 with its in-memory copy (i.e., the kernel file image 132) to find differences between them (step 306). If they are different (step 307 to step 308), the anti-rootkit module 121 determines if the difference is due to a modification made by a rootkit. That is, the anti-rootkit module 121 may check the difference for tell tale signs of rootkit modification. For example, the anti-rootkit module 121 may scan the difference or memory locations referenced in the difference for contents indicative of rootkit modification. If the difference is attributable to a rootkit, the anti-rootkit module 121 may restore the kernel file image 132 back to a known good condition (step 309 to step 310).

The virus patterns 123 may contain difference patterns known to have been due to rootkit infestation. The virus patterns 123 may also include known good data for patching over differences found by the anti-rootkit module 121 to restore the kernel file image 132 to a known good condition. In one embodiment, the anti-rootkit module 121 employs a pattern matching algorithm to scan differences for contents indicative of rootkit infestation. If there is a difference attributable to a rootkit, the portion of the kernel file image 132 that is different from that of the kernel binary files 130 may be patched to match the kernel binary files 130, thereby restoring the kernel file image 132 to a known good condition.

If the anti-rootkit module 121 does not find any difference between the kernel binary files 130 and the kernel file image 132 or if any found difference is not due to a rootkit, the anti-rootkit module 121 may restore the paging function and the interrupt dispatch table to their original conditions in the event the anti-rootkit module 121 modified them during the pre-scan (step 311). This typically has to be performed when the paging function, interrupt dispatch table, or both have been modified by a legitimate program.

After the foregoing steps, it may be assumed that the kernel file image 132 is clear or have been cleared of kernel rootkits. At this point, the scan engine 122 may start scanning the data storage device 106, the main memory 108, and other storage locations of the computer 100 for rootkits and other malicious codes (step 312). The scan engine 122 may remove detected rootkits and other malicious codes.

A particular example using an embodiment of the present invention is now described with reference to FIGS. 4 and 5. FIGS. 4 and 5 show an example involving rootkit infestation of the kernel file image 132 to modify the IoCreateFile routine, which is a file creation function in the Microsoft Windows™ operating system. The example rootkit replaces the first few lines of the IoCreateFile routine with a jump instruction to a rootkit code. It is to be noted that this particular example is provided for illustration purposes only and is not meant to be construed as a limitation of the invention.

FIG. 4A shows a flow diagram schematically illustrating the call flow from an application 402 to a file system 406 in the case where the IoCreateFile routine 405 is virus-free (i.e., not infected with any malicious code). In the example of FIG. 4A, the application 402 calls the routine 405 by way of kernel32.dll (labeled as 403) and the system service dispatch table (labeled as 404). The virus-free routine 405 executes to access the file system 406 as requested by the application 402. FIG. 4A shows the original machine and assembly code of the routine 405 prior to being infested by a rootkit. For example, the first line of code of the routine 405 is machine code "55", which corresponds to a push instruction.

FIG. 4B shows a flow diagram schematically illustrating the call flow from the application 402 to the file system 406 in the case where the routine 405 has been modified by a rootkit. As before, the application 402 calls the routine 405 by way of kernel32.dll (labeled as 403) and the system service dispatch table (labeled as 404). However, in the example of FIG. 4B, the rootkit has modified the routine 405 to add a jump instruction to a rootkit code 412. The modified routine 405 has been labeled as 405" to indicate the rootkit modification. The modified routine 405 now includes a move and jump instruction (labeled 405-1) before the original code of the routine 405 (labeled as 405-2). FIG. 4B shows the machine and assembly codes of the modification. The modification allows the rootkit code 412 to intercept any call to the file system using the routine 405.

Referring now to FIG. 5, there is shown a flow diagram of a method 500 of detecting kernel rootkits in accordance with an embodiment of the present invention. In the method 500, steps 510 and 511 perform a function similar to that of steps 306 and 307 of the method 300 (see FIG. 3), while steps 512 and 513 perform a function similar to that of steps 308 and 309 of the method 300.

In the method 500, the binary contents of the routine's file in permanent data storage ("file copy") is compared to the binary contents of the routine's copy in main memory (step 510). The block labeled 501 shows the contents of the routine's file copy, while the block labeled as 502 shows the contents of the routine's in-memory copy. In the example of FIG. 5, the in-memory copy of the routine (IoCreateFile in this example) has been modified by the rootkit to include a jump to a rootkit code as in FIG. 4B. The modification in this example involves adding code in the first few lines of the routine, followed by the original code (not shown) of the routine.

Continuing the example, the modification made by the rootkit to the routine is found because of a difference between the routine's file and in-memory copies (step 511). The difference matches a difference pattern for modifications typically performed by the rootkit (step 512). In this instance, the difference matches a difference pattern for the jump instruction to a particular memory location. To determine whether or not the modification is attributable to a rootkit rather than a legitimate program, the contents of the memory locations pointed to by the jump instruction may be scanned and compared to signatures of known rootkits (step 513). In this example, scanning memory locations beginning at the location pointed to by the jump instruction in the difference results in identification of the rootkit code 412 (see FIG. 4B). The scanning of the rootkit code 412 may be performed using a pattern matching algorithm. Other scanning algorithms may also be used without detracting from the merits of the present invention. The routine, which is part of the kernel file image in memory, is restored to a known good condition upon identification of the rootkit modification (step 514 to step 515). Otherwise, in the event the difference is not indicative of rootkit modification, any modification done to the routine as part of scanning the kernel file image for rootkits may be restored back (step 514 to step 516).

Improved methods and apparatus for detecting and removing kernel rootkits have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting kernel rootkits in a computer, the method comprising:
    pre-scanning a computer to prevent a kernel rootkit from interfering with a memory access operation to read a kernel file image, the kernel file image being a copy of an operating system kernel binary files loaded in main memory, the pre-scanning being performed before detecting kernel rootkits in the computer;
    reading the kernel binary files from a permanent storage device;
    after the pre-scanning of the computer, finding a difference between the kernel binary files and the kernel file image;
    comparing the difference to difference patterns known to have been due to modifications made by kernel rootkits to determine if the difference is attributable to a kernel rootkit; and
    restoring the kernel file image to a known good condition when the difference is attributable to a kernel rootkit.

2. The method of claim 1 further comprising:
    scanning the computer for malicious codes after the kernel file image has been restored to the known good condition.

3. The method of claim 1 wherein the pre-scanning of the computer comprises:
    restoring a paging function for accessing virtual memory locations from a first condition to a known good condition when the paging function is detected to have been modified.

4. The method of claim 3 further comprising:
    restoring the paging function back to the first condition when the paging function has been modified but not by a kernel rootkit.

5. The method of claim 1 wherein the pre-scanning of the computer comprises:
    restoring an interrupt dispatch table containing pointers to interrupt service routines from a first condition to a known good condition when the interrupt dispatch table is detected to have been modified.

6. The method of claim 5 further comprising:
    restoring the interrupt dispatch table back to the first condition when the interrupt dispatch table has been modified but not by a kernel rootkit.

7. The method of claim 1 wherein scanning the difference comprises:
    finding a jump instruction included in the difference; and
    scanning a memory location referenced by the jump instruction.

8. A computer comprising a main memory and a processor, the main memory configured to comprise:
    an anti-rootkit module configured to find a difference between operating system kernel files stored in a permanent data storage device of the computer and a kernel file image in the main memory, to compare the difference to difference patterns known to have been due to modifications made by rootkits to determine if the difference is due to a modification made by a rootkit to the kernel file image, and to restore the kernel file image to a known good condition when the difference is due to a modification made by a rootkit, the kernel file image being a loaded in-memory copy of the kernel files; and
    a scan engine configured to scan the computer for rootkits after the anti-rootkit module has restored the kernel file image to the known good condition.

9. The computer of claim 8 wherein the anti-rootkit module is configured to perform a pre-scan prior to finding the difference between the kernel files and the kernel file image, the pre-can comprising restoration of a modified paging function from a first condition to a second condition.

10. The computer of claim 9 wherein the anti-rootkit module is configured to restore the paging function back to the first condition when the paging function has been modified but not by a rootkit.

11. The computer of claim 8 wherein the anti-rootkit module is configured to perform a pre-scan prior to finding the difference between the kernel files and the kernel file image, the pres-can comprising restoration of a modified interrupt dispatch table from a first condition to a second condition.

12. A method of detecting rootkits in a computer, the method comprising:
    comparing a kernel file image in a main memory to operating system kernel binary files in a permanent storage device to find a difference between them, the kernel file image being an in-memory copy of the kernel binary files;

comparing the difference to difference patterns known to have been due to modifications by kernel rootkits to determine if the difference is due to a modification performed by a rootkit; and restoring the kernel file image in the main memory to a known good condition when the difference is due to a modification performed by a rootkit.

13. The method of claim 12 further comprising:

prior to comparing the kernel file image to the kernel binary files, performing a pre-scan to detect modification to a paging function for accessing virtual memory locations and to an interrupt dispatch table comprising pointers to interrupt service routines.

14. The method of claim 13 wherein the pre-scan comprises:

restoring a paging function for accessing virtual memory locations from a first condition to a known good condition when the paging function is detected to have been modified; and restoring an interrupt dispatch table containing pointers to interrupt service routines from a first condition to a known good condition when the interrupt dispatch table is detected to have been modified.

15. The method of claim 12 further comprising:

scanning the permanent storage device for rootkits and other malicious codes after the kernel file image in the main memory has been restored.

* * * * *